(No Model.)
T. P. CONANT.
ELECTRICAL DISTRIBUTION BY SECONDARY BATTERIES.
No. 389,638. Patented Sept. 18, 1888.
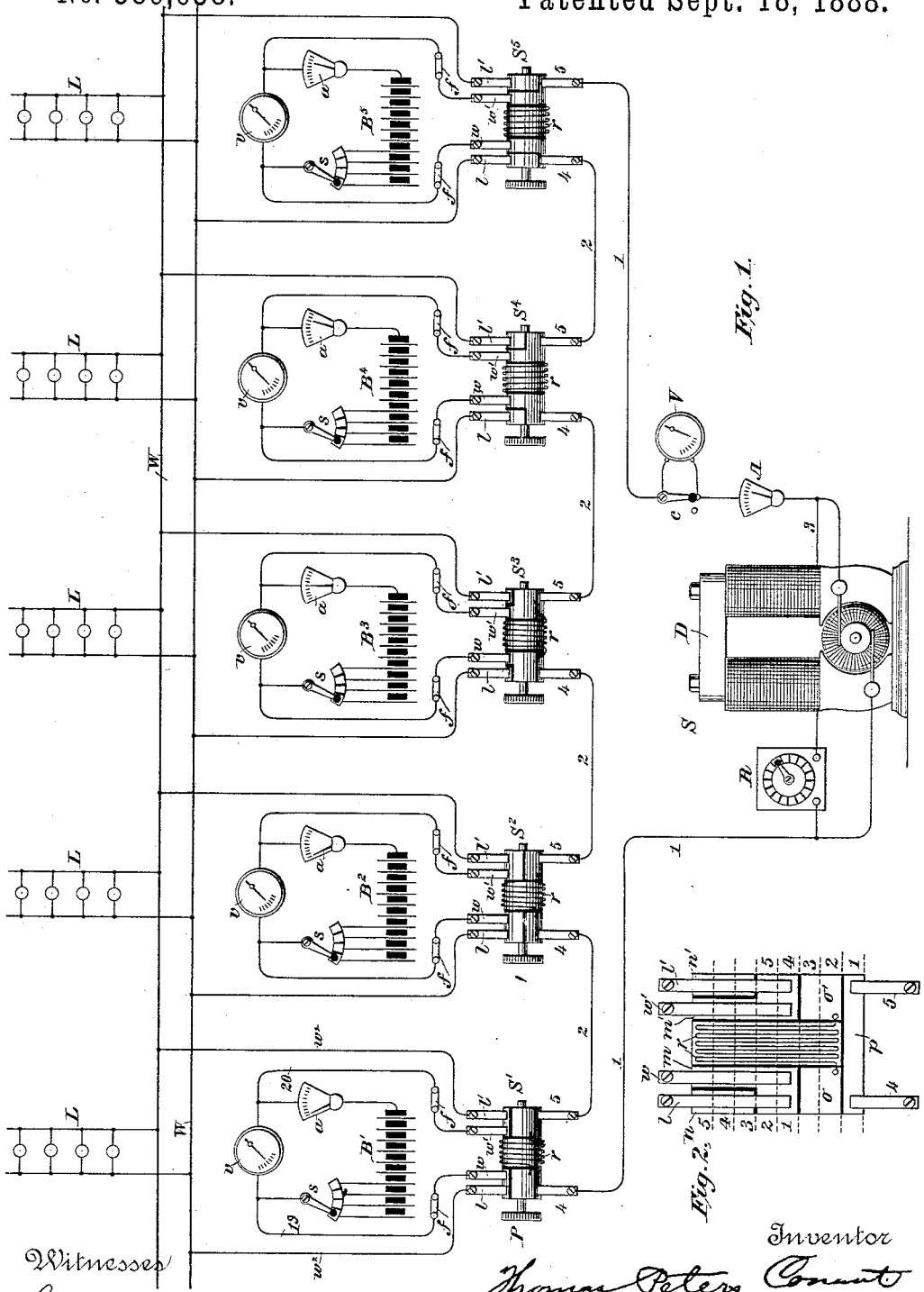

UNITED STATES PATENT OFFICE.

THOMAS PETERS CONANT, OF NEW YORK, N. Y., ASSIGNOR TO THE ELECTRICAL ACCUMULATOR COMPANY, OF NEW YORK.

ELECTRICAL DISTRIBUTION BY SECONDARY BATTERIES.

SPECIFICATION forming part of Letters Patent No. 389,638, dated September 18, 1888.

Application filed April 10, 1888. Serial No. 270,181. (No model.)

*To all whom it may concern:*

Be it known that I, THOMAS PETERS CONANT, a citizen of the United States, and a resident of the city, county, and State of New York, have made certain new and useful Improvements in Electrical Distribution by Secondary Batteries, of which the following is a specification.

In the distribution of electricity for the purpose of supplying light, heat, and power it is desirable, for economic reasons, to use conductors of the least weight per unit of length, and a system of distribution to which conductors of this description are applicable may make use of a prime motor located a long distance from the locality where the energy is to be employed. This is an item of increased economy, the effective application of which, with many other advantages, is dependent upon the successful accomplishment of a suitable arrangement of apparatus for electrical storage.

It has heretofore been proposed to charge a series of storage-battery cells located at a series of sub-stations and to provide a separate working-circuit for each sub-station or the series of cells located at such sub-station; but in this arrangement it is quite likely that one series of cells may be called upon to yield more energy than it has absorbed, while a second and adjoining series of cells is not called upon to supply anywhere near the limit of its capacity. If, now, we include both these series of cells, with their translating devices, in one common circuit, neither series will be overloaded, and the translating devices—the lamps—will be fully supplied. The same is true of a larger number of sub-stations.

My invention contemplates a central station, at which is located a primary generator of electricity, as a dynamo-electric machine; a series of sub-stations, at each of which is located one or more series of cells of secondary battery; a charging-circuit electrically connecting the said central station and the series of sub-stations, and in which the dynamo and batteries at one or more stations are or may be included; a working-circuit containing a series of translating devices, as lamps, which circuit may extend over a comparatively large territory, and into which one or all of the said series of secondary-battery cells are or may be connected, but with which the dynamo or dynamo-circuit cannot be connected. At each station I place a switch and an artificial resistance. The switch is capable of arranging the dynamo-circuit, battery-circuit, lamp-circuit, and artificial resistance in five successive and different relations with respect to each other as regards electrical connections, to wit: first, dynamo-circuit complete and separate, battery and lamp circuit connected therewith; second, dynamo-circuit includes resistance-coil, battery and lamp circuit still united; third, dynamo-circuit still includes resistance-coil, battery-circuit and lamp-circuit disconnected; fourth, dynamo-circuit includes resistance and battery in parallel circuit, lamp-circuit disconnected; fifth, dynamo-circuit includes battery alone, lamp-circuit and resistance disconnected.

The accompanying drawings illustrate my invention.

Figure 1 is a complete plan view. Fig. 2 is a diagram of the surface of the switch produced, showing the relative and absolute positions of the different contacts under five different and successive positions of the switch.

S S$^5$ are six separate stations. At the central station, S, there is a shunt-wound dynamo, D. The shunt-circuit 3 contains the field-coils and a variable resistance, R. There is also an ammeter, A, and a voltmeter, V, with a switch, c, for removing the latter from circuit. The dynamo is in a charging-circuit, 1 2, electrically connecting all stations.

W is a working-circuit, electrically uniting all sub-stations together, and having in its circuit a series of translating devices, as incandescent lamps, L, distributed at intervals throughout its length. There are represented five sub stations, and the connections of the elements with respect to each other are shown in a different relation at each station. As the apparatus is the same at each station, I will describe it by reference to station S'. There is here shown a series of secondary-battery cells, B', in a battery-circuit, 19 20. This circuit has terminals in the fixed contacts $w\ w'$. There are fusible sections $f$ in circuit 19 20, a switch, $s$, for varying the number of cells in circuit, an ammeter, $a$, and a voltmeter, $v$.

From the working-circuit W there are wires $w^2 w^2$, terminating in fixed contacts $l\ l'$. The dynamo-circuit is divided at each station, terminating in fixed contacts 4 and 5.

At each sub-station there is a switch or circuit-changer, P, consisting of a cylinder of insulating material located upon an arbor to be placed in suitable bearings, and having a hand-wheel fixed thereto, by which it may be rotated. Fig. 2 is the produced surface of this circuit-changer. This circuit-changer consists of three pairs of electrical contacts and one single contact arranged on a movable cylinder, each contact being insulated from all the other contacts. There are also three pairs of fixed contacts arranged in a position such that each pair of fixed contacts makes contact successively with each pair of movable contacts, respectively. The single movable contact $p$ is a strip extending from end to end of the cylinder, and makes contact with one pair of fixed contacts, 4 and 5, respectively, arranged near opposite ends of the cylinder. There are two contacts, $o$ and $o'$, in position adjoining the fixed contact $p$, but insulated from it. Each contact $o$ or $o'$ occupies one-third the length of the cylinder, and each is located at the extreme opposite ends thereof. Their breadth is about twice the breadth of the contact $p$. Next adjoining contacts $o$ and $o'$, but separated therefrom by an insulating-bushing as narrow as possible, is a pair of contacts, M M'. Each is composed of an L-shaped piece, the shorter arm of which has the same superficial area as the contacts $o$ and $o'$; but integral therewith, and distant from the end of the cylinder a space a little greater than the breadth of the contact $p$, is located the longer arm of the L-shaped contact, which longer arm is about the same width as the contact $p$, but extends round the cylinder very nearly to the first-named contact, $p$. Fixed contacts $w\ w'$ are in position to make contact with $m\ m'$, respectively, throughout the length thereof. Fixed contacts $l\ l'$ are located outside contacts $w\ w'$ and nearer the ends of the cylinder, respectively, in position to make contact with the shorter arm of these L-shaped contacts, and also with the third pair of contacts, $n\ n'$. These are strips very similar to $p$, located between the ends of the cylinder and the longer arms of the contacts $m\ m'$, respectively. In length they extend round the cylinder to near the contact $p$. The insulating-bushing separating one pair of contacts from another in the direction of rotation of the cylinder is so narrow or so thin that the fixed contacts lap from one movable contact to another, making contact with both without breaking circuit while passing from one to the other. It is in this way that the connection described as the fourth position is attained, as hereinafter described. There is an artificial resistance uniting the pair of contacts $o\ o$, which is substantially equal in amount to the resistance of the battery added to a resistance equal to the effect of the counter electro-motive force due to the introduction of the battery. Fig. 2 has indicated upon it by means of dotted lines and corresponding figures five separate steps or positions which the rotating circuit-changer may be caused to assume. When the two pairs of contacts marked $w\ w'\ l\ l'$ are at the line marked 1, the pair of contacts marked 4 and 5 are at the line marked 1, as shown. The same is true, respectively, of the four other positions. The connections resulting from these five positions are the following, as will be seen by Fig. 2, and by referring to the sub-station $S'$ to $S^5$, bearing the corresponding numeral: first, dynamo-circuit cut straight through, battery-circuit and lamp-circuit united; second, dynamo-circuit includes the resistance $r$, battery-circuit and lamp-circuit still united; third, dynamo-circuit still includes resistance-coil, but the battery-circuit and the lamp-circuit are disconnected; fourth, dynamo-circuit includes the artificial resistance and the battery in parallel circuit, the lamp-circuit being entirely disconnected; fifth, the dynamo-circuit includes the battery alone, the lamp-circuit and the resistance being entirely disconnected. These positions may be coincident at every station, or they may be assumed at any station at pleasure. The only regulation necessary is at the dynamo, where the electro-motive force must be kept above that of the counter electro-motive force, due to the number of cells in the charging-circuit, whatever the number may be. The number of cells in the working-circuit is regulated by the demand—i. e., by the number of lamps in circuit—and the locations of the sub-stations, batteries included, are determined by the location of the "load"—that is, of the lamps which are employing the electric energy at any given period of time.

What I claim, and desire to secure by Letters Patent, is—

1. The combination of a primary generator of electricity located at one station, two or more sub-stations, at each of which are located one or more series of secondary-battery cells, a charging-circuit containing the primary generator and electrically uniting all stations, a working-circuit containing a series of translating devices, as lamps, and electrically uniting all sub stations, and a switch or circuit-changer for each series of battery-cells, whereby each and every series of cells may be included in either circuit.

2. The combination of a dynamo-electric machine located at one station, two or more series of secondary-battery cells located at two or more sub-stations, two separate electrical circuits, both of which enter each and every sub-station, one of which circuits contains the dynamo and the other the translating devices, as lamps, and a switch or circuit-changer for each series of cells, whereby one or more series of cells may be included in either circuit.

3. The combination of an electrical circuit, a series of translating devices, as lamps, connected to said circuit at intervals, a series of sub-stations on said circuit, a series of cells of secondary battery at each sub station, and a switch or circuit-changer for each series of cells, whereby the battery at any one or more stations may be connected with said circuit to equalize the potential.

4. The combination of a circuit containing a secondary battery, a circuit containing a generator of electricity, a circuit containing a series of translating devices, as lamps, a pair of fixed contact-points for each circuit, a switch or circuit-changer having three pairs of contacts, an artificial resistance permanently connected to one pair of said contacts, and means for imparting a progressive movement to said switch through five successive steps, whereby the dynamo and the battery and the battery and lamps are successively connected and disconnected, substantially as described.

THOMAS PETERS CONANT.

Witnesses:
DANIEL E. DELAVAN,
WM. B. VANSIZE.